UNITED STATES PATENT OFFICE.

MAX HENRY ISLER, OF MANNHEIM, GERMANY, ASSIGNOR TO BADISCHE ANILIN & SODA FABRIK, OF LUDWIGSHAFEN-ON-THE-RHINE, GERMANY, A CORPORATION OF BADEN.

ANTHRACENE COMPOUND AND PROCESS OF MAKING SAME.

No. 798,104.     Specification of Letters Patent.     Patented Aug. 29, 1905.

Application filed January 31, 1905. Serial No. 243,502.

*To all whom it may concern:*

Be it known that I, MAX HENRY ISLER, chemist, a citizen of the Swiss Republic, residing at Mannheim, in the Grand Duchy of Baden, German Empire, have invented new and useful Improvements in Anthracene Compounds and Processes of Making the Same, of which the following is a specification.

My invention relates to the production of new products which are of use for the preparation of coloring-matters.

In the specification of the application for Letters Patent, Serial No. 240,099, filed January 7, 1905, upon which Letters Patent were granted the 18th day of April, 1905, No. 787,859, is described the production of new products of the anthracene series by condensing certain anthracene compounds with glycerin. These anthracene compounds include anthracene itself, also anthraquinone, anthranol, oxanthranol, and the sulfo-acids of these compounds, and in all cases the new condensation products contain a benzanthrone grouping. I have now discovered that similar new compounds which fall generically under the claims of the above-mentioned specification, but which are specifically different, can be obtained by condensing a naphthanthraquinone body with glycerin. The bodies of which I make use in my invention include naphthanthraquinone itself, also its homologues and the hydro derivatives of all these compounds. The condensation proceeds in a manner very similar to that described in the above-mentioned specification, and bodies containing the benzanthrone grouping, although, of course, with another benzene ring attached, are obtained. These can conveniently be termed specifically "benznaphthanthrones" and they possess the following properties: They are insoluble in water, but are soluble in concentrated sulfuric acid. On being melted with caustic alkali they yield dyestuffs which, similarly to to those obtained from the products claimed in the above-mentioned specification, can be dyed from alkaline-hydrosulfite vat. They produce shades, however, which are more greenish blue.

The following examples will serve to further illustrate the nature of my invention, which, however, is not confined to these examples. The parts are by weight.

*Example 1—Condensation of naphthanthraquinone with glycerin.*—Suspend one (1) part of napthanthraquinone in from twenty (20) to thirty (30) parts of sulfuric acid (containing about eighty-two (82) per cent. of $H_2SO_4$), add one (1) part of glycerin and one (1) part of anilin sulfate, and heat the whole for from thirty (30) to sixty (60) minutes at a temperature of one hundred and fifty degrees centigrade, (150° C.) Allow the red melt to cool, pour into water, filter, and wash the precipitate until the same is free from acid. If it be desired to purify the compound further, it can be extracted with acetone, whereupon a product which melts at a temperature of from one hundred and eighty-six to one hundred and eighty-eight degrees centigrade, (186° to 188° C.,) and to which I have given the name "benznaphthanthrone," goes into solution. It is soluble in concentrated sulfuric acid, yielding a yellowish-red solution with a slight yellowish fluorescence and on melting with caustic alkali yields a greenish-blue coloring-matter, which from an alkali-hydrosulfite vat dyes vegetable fiber substantively.

*Example 2—Condensation of a hydro compound of naphthanthraquinone with glycerin.*—First convert the naphthanthraquinone into its hydro compound in the following manner: Stir together fifty (50) parts of naphthanthraquinone and one thousand (1,000) parts of water, then add three hundred and fifty (350) parts of caustic-soda solution (containing about twenty-four (24) per cent. of NaOH) and add, while stirring, fifty-six (56) parts of zinc-dust. Heat at a temperature of ninety (90) degrees centigrade for from four (4) to five (5) hours, while excluding the air as far as possible, and filter rapidly with the aid of the pump, allowing the filtrate to run into a mixture of two hundred (200) parts of sulfuric acid (containing sixty-two (62) per cent. of $H_2SO_4$) and two hundred (200) parts of ice, whereupon the hydro compound is precipitated. Filter this off, wash, and press until the press cake weighs about one hundred and five (105) parts.

To produce the condensation product, heat together the hydro compound obtained as described above, fifty (50) parts of anilin sulfate, one hundred (100) parts of glycerin, and fourteen hundred (1,400) parts of sulfuric acid (containing about eighty-two (82) per cent. of $H_2SO_4$) for one (1) hour at a temperature of one hundred and ten degrees centigrade, (110° C.) Allow the melt to cool, pour into water, filter, and wash the precipitate free from acid and press. It can be purified as described in Example 1 and yields the same compound, melting at a temperature of between one hundred and eighty-six and one hundred and eighty-eight degrees centigrade, (186°–188° C.)

Now what I claim is—

1. The process for the production of new anthracene compounds containing a benzanthrone grouping, by condensing a hereinbefore-defined naphthanthraquinone body with glycerin.

2. The process for the production of new anthracene compounds containing a benzanthrone grouping, by condensing a hereinbefore-defined naphthanthraquinone body with glycerin in the presence of sulfuric acid.

3. The process for the production of a new anthracene compound containing a benzanthrone grouping, by condensing naphthanthraquinone with glycerin.

4. The process for the production of a new anthracene compound containing a benzanthrone grouping, by condensing naphthanthraquinone with glycerin in the presence of sulfuric acid.

5. As new articles of manufacture the anthracene compounds containing a benzanthrone grouping and called benznaphthanthrones, which can be obtained by condensing a hereinbefore-defined naphthanthraquinone body with glycerin, which compounds dissolve in concentrated sulfuric acid, and which on melting with caustic alkali yield coloring-matters which from an alkaline-hydrosulfite vat dye vegetable fiber substantively.

6. As a new article of manufacture the anthracene compound containing a benzanthrone grouping and called benznaphthanthrone, which can be obtained by condensing naphthanthraquinone with glycerin, which compound melts at a temperature of about one hundred and eighty-eight degrees centigrade, which dissolves in concentrated sulfuric acid yielding a yellowish-red solution with a slight yellowish fluorescence, and which on melting with caustic alkali yields a greenish-blue coloring-matter which from an alkaline-hydrosulfite vat dyes vegetable fiber substantively.

In testimony whereof I have hereunto set my hand in the presence of two subscribing witnesses.

MAX HENRY ISLER.

Witnesses:
J. ALEC. LLOYD,
JOS. H. LEUTE.